(12) United States Patent
Whitehead

(10) Patent No.: US 12,072,523 B2
(45) Date of Patent: Aug. 27, 2024

(54) LINEAR OPTICAL CAVITY ARRAY LIGHT GUIDE

(71) Applicant: The University of British Columbia, Vancouver (CA)

(72) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 138 days.

(21) Appl. No.: 17/736,972

(22) Filed: May 4, 2022

(65) Prior Publication Data

US 2022/0334304 A1 Oct. 20, 2022

Related U.S. Application Data

(63) Continuation of application No. PCT/CA2020/051509, filed on Nov. 6, 2020.

(60) Provisional application No. 62/932,555, filed on Nov. 8, 2019.

(51) Int. Cl.
*F21V 8/00* (2006.01)

(52) U.S. Cl.
CPC ......... *G02B 6/0055* (2013.01); *G02B 6/0096* (2013.01)

(58) Field of Classification Search
CPC .............. G02B 6/0055; G02B 6/0096
See application file for complete search history.

(56) References Cited

U.S. PATENT DOCUMENTS

| 4,260,220 A * | 4/1981 | Whitehead | G02B 6/0096 385/125 |
| 4,787,708 A * | 11/1988 | Whitehead | G02B 6/10 385/133 |
| 4,805,984 A * | 2/1989 | Cobb, Jr. | G02B 6/10 359/598 |
| 4,850,665 A * | 7/1989 | Whitehead | G02B 6/4298 385/133 |
| 5,339,382 A | 8/1994 | Whitehead | |
| 5,481,637 A | 1/1996 | Whitehead | |
| 6,621,973 B1 | 9/2003 | Hoffman | |
| 8,057,073 B2 | 11/2011 | Lee | |
| 8,075,167 B2 | 12/2011 | Shin | |
| 2006/0182409 A1 | 8/2006 | Sudol | |
| 2008/0037943 A1 | 2/2008 | Lee et al. | |
| 2011/0244187 A1 | 10/2011 | Rinko | |
| 2014/0211331 A1 | 7/2014 | Padiyath et al. | |

(Continued)

FOREIGN PATENT DOCUMENTS

WO 2018213292 A1 11/2018
WO 2019087118 A1 5/2019

*Primary Examiner* — Abdulmajeed Aziz
*Assistant Examiner* — Jessica M Apenteng
(74) *Attorney, Agent, or Firm* — Todd A. Rattray; Oyen Wiggs Green & Mutala LLP

(57) ABSTRACT

Light reflective films have example application in hollow light guides and luminaires. The films comprise parallel channels distributed in layers or otherwise at different depths in the films. The channels provide interfaces at which light is reflected or redirected. The channels have a sufficient density that the film reflects a large proportion of light incident on a first face of the film. The channels may be filled with a gas such as air, a vacuum or a polymer for example. Methods for making films can include stacking thin sheets patterned with grooves, casting or extrusion.

20 Claims, 9 Drawing Sheets

(56) References Cited

U.S. PATENT DOCUMENTS

2016/0018592 A1    1/2016   Savvateev et al.
2019/0011629 A1    1/2019   Solomon et al.

* cited by examiner

LINEAR OPTICAL CAVITY ARRAY LIGHT GUIDE

CROSS-REFERENCE TO RELATED APPLICATIONS

This application is a continuation of Patent Cooperation Treaty (PCT) application No. PCT/CA2020/051509 having an international filing date of 6 Nov. 2020, which in turn claims priority from, and for the purpose of the United States of America the benefit under 35 U.S.C. § 119 of, U.S. application No. 62/932,555 filed 8 Nov. 2019. All of the applications referred to in this paragraph are hereby incorporated herein by reference.

FIELD

The present technology relates to light reflecting optical films and to light guides and other optical systems that include light reflecting optical films.

BACKGROUND

Light guides are used for a wide range of purposes including architectural lighting (illumination). For example, a light guide may carry light from a light bulb or solar light into an interior space in a building.

A light guide may be made of a hollow tube of a light reflective material. One type of light reflective material is a prism light guide material made of a transparent dielectric material with prismatic surfaces formed on an exterior facing surface. An example of prism light guide material is 3M™ Optical Lighting Film OLF 2405 which is a transparent plastic film that has a prism structure on one side and a very smooth surface on the other side.

A prism light guide material reflects light by total internal reflection, which is a non-absorptive process. Total internal reflection occurs when light travelling in a first medium that has a higher index of refraction encounters an interface with a second medium having a lower index of refraction at an angle of incidence relative to a normal vector that is perpendicular to the interface that is larger than a critical angle. The critical angle is given by:

$$\theta_C = \sin^{-1} \frac{n_2}{n_1}$$

where: $\theta_C$ is the critical angle; $n_1$ is the index of refraction of the first medium and; $n_2$ is the index of refraction of the second medium. Prism light guides are only able to guide light which falls within a limited range of angles relative to the prismatic surfaces.

There remains a need for light guides and materials for making light guides that improve on the current state of the art by providing light guides that are one or more of more efficient, less expensive to make, more cost effective, lighter in weight, and simpler to make than current light guides.

SUMMARY

This invention has a number of aspects. These include, without limitation:
optical films that have application in light guides;
hollow light guides;
luminaires; and
methods for making optical films.

An example aspect of the invention provides a light reflecting film comprising a thin layer of a first material having a thickness and a first index of refraction and channels formed within the layer, the channels extending parallel to one another in a longitudinal direction. The channels comprise a second material having a second index of refraction less than the first index of refraction. The channels are arranged at a plurality of different depths relative to a front face of the film. The channels having a cross sectional shape that provides interfaces at which light incident from the front face of the film is refracted or reflected.

In some embodiments, at the interfaces at least some of the light is reflected by total internal reflection.

In some embodiments, the channels have dimensions parallel to a thickness dimension of the film that are less than ½ of the thickness of the film.

In some embodiments, the channels have dimensions parallel to a thickness dimension of the film that are less than ⅓ of a thickness of the film.

In some embodiments, the channels have dimensions parallel to a thickness dimension of the film that are less than ¼ of a thickness of the film.

In some embodiments, wherein the interfaces include first and second interfaces of each of the channels.

In some embodiments, the first and second interfaces are each oriented at an angle of 45 degrees to the front face.

In some embodiments, the first and second interfaces are oriented at a right angle to one another.

In some embodiments, the interfaces of adjacent ones of the channels are mirror images of one another.

In some embodiments, the cross sectional shape of the channels is an isosceles triangle.

In some embodiments, a hypotenuse of the isosceles triangle is parallel to the front face of the film.

In some embodiments, in a cross section of the light reflecting film the channels are arranged in a regular array comprising a plurality of layers of channels.

In some embodiments, in each of the layers the channels are spaced apart from one another.

In some embodiments, the channels of at least one of the layers are staggered relative to the channels of at least one other one of the layers.

In some embodiments, the channels in different ones of the layers have different cross sectional areas.

In some embodiments, the channels in different ones of the layers have different cross sectional shapes.

In some embodiments the film comprises a plurality of stacked together sheets, each of the plurality of sheets having a first face carrying longitudinal parallel grooves that is against a second face of an adjacent one of the plurality of sheets wherein the channels are defined between the grooves and the second face of the adjacent one of the sheets.

In some embodiments, the grooves are V-shaped in cross section.

In some embodiments, a dihedral angle of the grooves is 90 degrees±2 degrees.

In some embodiments, the second face of each of the plurality of sheets is flat.

In some embodiments, the grooves are spaced apart by flat surfaces.

In some embodiments, adjacent ones of the plurality of sheets are held together by adhesive bonds or welds.

In some embodiments, a first one of the plurality of sheets at a front face of the film is made of a different material from one or more other ones of the plurality of sheets and the material of the first one of the sheets absorbs light less strongly than the material of the one or more other ones of the plurality of sheets.

In some embodiments, the film comprises at least 4 of the layers.

In some embodiments, the film comprises 2 to 15 of the layers.

In some embodiments, the film comprises at least 2 of the layers.

In some embodiments, more than 2% of light incident on each of the layers from a direction of a front face of the film passes through the layer.

In some embodiments, the film comprises a plurality of affixed together sheets and at least one face of at least some of the sheets is patterned with a row of longitudinally extending spaced apart ridges separated by grooves, wherein the channels are defined between the grooves of one of the sheets and a face of an adjacent one of the sheets.

In some embodiments, the interfaces are provided by flanks of the ridges.

In some embodiments, the ridges have flattened tops.

In some embodiments, the sheets are bonded together by adhesive or welding on the flattened tops.

In some embodiments, the adhesive or welding covers no more than 1% of an aggregate area of the flattened tops.

In some embodiments, the channels are filled with a gas.

In some embodiments, the gas is air.

In some embodiments, the channels are sealed.

In some embodiments, the material of the channels is a polymer.

In some embodiments, the channels have a transverse dimension of at least 1 µm.

In some embodiments, the thickness of the film is at least 100 µm.

In some embodiments, the film reflects at least 98% of visible light incident on the film.

In some embodiments, the film comprises light transmitting features distributed over at least a portion of the film. The light transmitting features may, for example, comprise one or more of:
  apertures extending through the film;
  areas in which the channels are filled with a material having an index of refraction that substantially matches the first index of refraction; and
  areas in which some or all of the channels are flattened.

In some embodiments, the film has an active area within which the film reflects at least 90% of light that is incident on a front face of the film at an angle of 45 degrees or more to a direction normal to the film and the channels are arranged at a plurality of different depths relative to the front face of the film and distributed in the film such that at least within the active area substantially all straight lines in a transverse cross section plane of the film that originate from any point P on the front face of the film and enter the film with an angle in the range of ±ϕ of a plane that is parallel to the channels and is perpendicular to the front face of the film cross at least one of the channels before reaching a rear face of the film where ϕ is 60 degrees.

In some embodiments, ϕ is 30 degrees

In some embodiments, within the active area the film reflects at least 90% of light having a wavelength in the range of 500 nm to 700 nm that is incident on the front face of the film at an angle of 45 degrees or more to a direction normal to the film.

In some embodiments, an overall thickness of the film is in the range of 0.1 mm to 1 mm.

In some embodiments, an overall thickness of the film is 2 mm or less.

Another aspect of the invention provides a hollow light guide comprising a film as described herein. The film may be formed into a tube wherein the front face of the film faces an interior of the tube.

In some embodiments, the tube has a diameter in the range of 8 cm to 40 cm.

Another aspect of the invention provides a luminaire comprising a hollow light guide as described herein. The luminaire may comprise a light source at one end of the hollow light guide and a light source or a reflector at a second end of the hollow light guide.

In some embodiments, the film comprises light transmitting features.

In some embodiments, the light transmitting features have a non-uniform density distribution along the hollow light guide.

In some embodiments, the light transmitting features uniformly distribute light from the light source along the length of the hollow light guide.

In some embodiments, the light transmitting features comprise apertures in the film.

In some embodiments, the light transmitting features comprise areas in which the channels are filled with a material having an index of refraction close to the first index of refraction.

In some embodiments, the light transmitting features comprise areas in which the channels are flattened.

Another aspect of the invention provides a hollow light guide comprising an optical wall that extends in an axial direction and comprises a continuous matrix of material having a first refractive index, and multiple discontinuous cavity regions that form channels within the matrix, each of the cavity regions having a second refractive index that is significantly lower than the first refractive index. a cross sectional shape of the guide is relatively constant along the axial direction. A surface normal vector at any point on any boundary of the cavity regions is substantially perpendicular to the axial direction. The cavity regions are arranged in the matrix such that no more than than 5% of light rays pass directly from inside to outside the hollow light guide without striking one of the cavity regions and the net effective reflectivity of the wall is greater than 90%.

In some embodiments, for light rays that are partially collimated parallel to the axial direction: each channel has, by virtue of total internal reflection, an effective reflectivity of greater than 20%.

In some embodiments, for light rays that originate partially collimated parallel to the axial direction: each channel has, by virtue of total internal reflection, an effective reflectivity of greater than 50%.

In some embodiments, herein the plurality of channels have the property of octature whereby an angle between a vector normal to any selected surface of the cavity and the nearest internal surface of the optical wall is an integer multiple of 45° to within ±2%.

In some embodiments, the channels are sufficiently numerous and overlapping that the net effective reflectivity of the optical wall is greater than 95%.

In some embodiments, the channels are sufficiently numerous and overlapping that the net effective reflectivity of the optical wall is greater than 98%.

In some embodiments, the channels are triangular in cross section and have one face that faces radially outward and is parallel to an inner face of the optical wall.

Some embodiments comprise a light source that includes a first light emitter at a first end of the hollow light guide and one or both of a second light emitter and a reflector at a second end of the hollow light guide.

Some embodiments comprise light transmitting features having a density distribution as a function of length along the hollow light guide.

In some embodiments, the density distribution is selected to cause light from the light source to pass through a wall of the hollow light guide with a distribution of intensity that is substantially uniform.

Another aspect of the invention provides a light reflecting film comprising: a layer of a first material having a thickness and a first index of refraction wherein formed within the layer are channels extending parallel to one another in a longitudinal direction, the channels comprising a second material having a second index of refraction less than the first index of refraction. The film has an active area within which the film reflects at least 90% of light that is incident on a front face of the film at an angle of 45 degrees or more to a direction normal to the film. The channels are arranged at a plurality of different depths relative to the front face of the film and distributed in the film such that at least within the active area substantially all straight lines in a transverse cross section plane of the film that originate from any point P on the front face of the film and enter the film with an angle in the range of ±φ of a plane that is parallel to the channels and is perpendicular to the front face of the film cross at least one of the channels before reaching a rear face of the film where φ is 60 degrees.

In some embodiments, φ is 30 degrees

In some embodiments, within the active area the film reflects at least 90% of light having a wavelength in the range of 500 nm to 700 nm that is incident on the front face of the film at an angle of 45 degrees or more to a direction normal to the film.

Another aspect of the invention provides a method for making a light reflective film as described herein, the method comprising extruding a polymer material having a first index of refraction through a die that forms the parallel channels within the polymer material, the channels having a second index of refraction different from the first index of refraction and being arranged at a plurality of different depths relative to a front face of the film, the channels having cross sectional shapes that provide interfaces at which light incident from the front face of the film is refracted or reflected.

Another aspect of the invention provides a method for making a light reflective film, the method comprising:
assembling a stack of light transmissive sheets, wherein a plurality of the sheets have a first face patterned with spaced apart parallel grooves and the sheets are oriented so that the grooves in different ones of the sheets are parallel; and
affixing the plurality of sheets together.

In some embodiments, on the first faces of the plurality of the sheets the grooves are spaced apart by flat areas and assembling the sheets comprises abutting the flat areas against a second face of another adjacent one of the sheets.

In some embodiments, affixing the sheets together comprises applying welds or adhesive to attach the flat areas of one or more of the sheets to the second face of another of the sheets.

In some embodiments, the method comprises forming light transmissive features at spaced apart locations in the film.

In some embodiments, forming the light transmissive features comprises perforating some or all of the sheets.

In some embodiments, forming the light transmissive features comprises pressing the film or some or all of the sheets to locally flatten the grooves in some or all of the sheets.

In some embodiments, the pressing comprises hot pressing.

In some embodiments, the sheets are made of a first material having a first index of refraction and the method comprises filling the grooves in some or all of the sheets with a second light transmissive material having a second index of refraction that is different from the first index of refraction before assembling the sheets.

In some embodiments, the method comprises forming the grooves on the sheets in a roll to roll process.

In some embodiments, assembling the stack of light transmissive sheets comprising assembling at least three of the light transmissive sheets of which at least two of the light transmissive sheets have a first face patterned with spaced apart parallel grooves.

In some embodiments, the stack of sheets comprises 2 to 15 of the sheets in which the first face is patterned with the spaced apart parallel grooves.

In some embodiments, assembling the sheets comprises staggering the grooves in different ones of the sheets.

Another aspect of the invention provides a method for making a light reflective film, the method comprising:
arranging a plurality of filaments or rods of a second light transmissive material having a second index of refraction to be parallel to and spaced apart from one another and;
casting the filaments or rods into a film of a first material having a first index of refraction greater than the second index of refraction such that the filaments or rods are distributed at different depths within the film and have a density such that the film reflects at least 90% of light incident on a first face of the film.

In some embodiments, the fibers or rods comprise hollow fibers.

In some embodiments, the first material is a thermosetting polymer.

In some embodiments, the method comprises forming the first material around the rods or filaments by a polymerization reaction.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
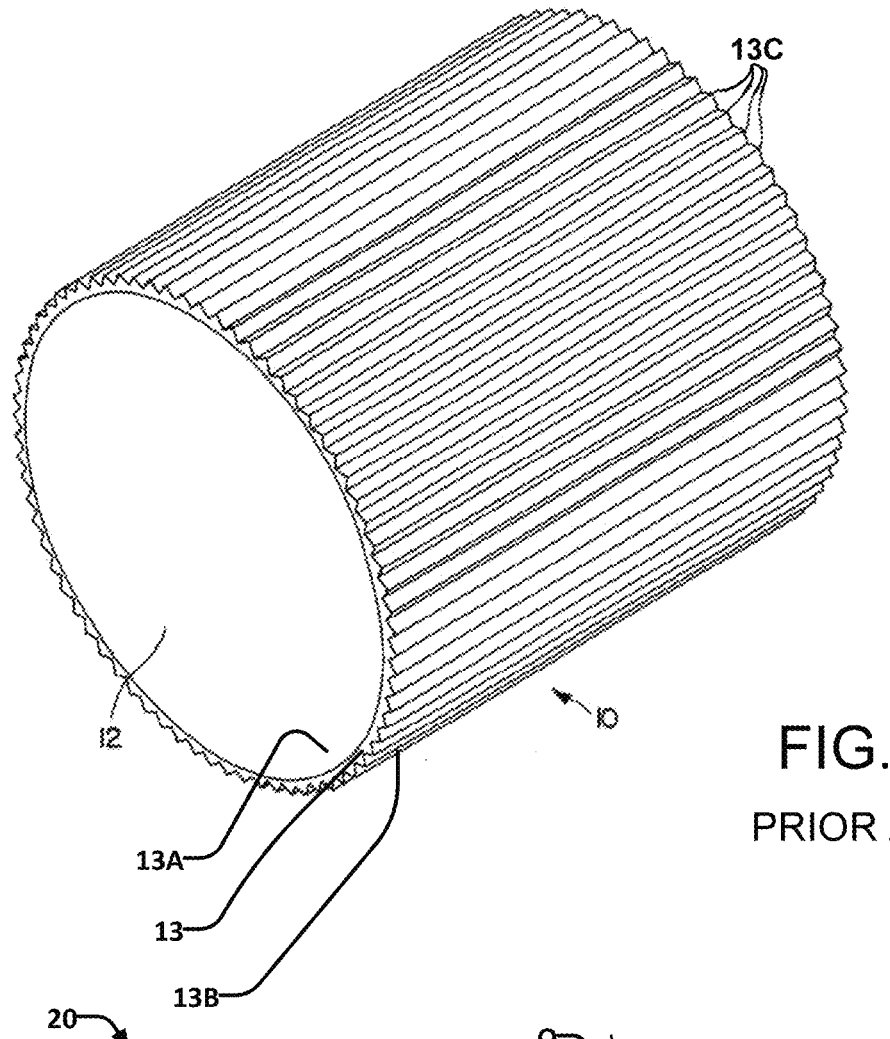
FIG. 1 is a perspective view of a prior art prism light guide.

FIG. 1 is a perspective view of an example prior art light guide 10. Light guide 10 comprises a hollow tube having a central bore 12 defined inside a wall 13 made of a film of prism light guide material. An example of prism light guide material is 3M™ Optical Lighting Film OLF 2405. This material is a transparent plastic film with a precise prism structure on one side and a very smooth surface on the other side. The 3M™ Optical Lighting Film OLF 2405 has a thickness of 20 mil (about 0.5 mm).

Light guide 10 typically has a diameter in the range of about 10 cm to 25 cm. The prism light guide material is oriented in wall 13 so that the smooth face of the prism light guide material provides an inside face 13A of wall 13 and the prism structure of the prism light guide material provides an outside face 13B of wall 13.

Outside face 13B of wall 13 comprises longitudinally-extending prisms 13C. Light travelling along light guide 10 is guided by reflections that occur in prisms 13C. Since the reflection occurs by total internal reflection, in theory there is very little loss of light from light guide 10. Some prism light guide materials reflect 98% or more of the light that is incident on them within a specified angular range.

The inventor has determined that prism light guides of the type illustrated in FIG. 1 have a number of disadvantages. These include:
 In practice, optical efficiency is lower than theoretical predictions. A significant reason for this is that light can escape instead of being totally internally reflected due to imperfections in the shape and surface finish of prisms 13C. Forming prisms 13C to have perfectly formed (sharp) corners is not practical with current mass production technologies.
 High cost due to the expensive manufacturing process that is needed to minimize corner imperfection, and to keep surface flatness errors small in relation to the facet size.
 It is hard or impossible to find a practical material composition for making a prism light guide material that both absorbs very little light and also facilitates high precision mass production. Additives that are available for enhancing molding accuracy typically absorb light. Thus in making prism light guide films there is a tradeoff between losing light by absorption and losing light as a result of imperfections in the form of prisms 13C. Often this tradeoff results in undesirably high light loss. For example it is typical for 1% of light to be absorbed in each interaction with the prism light guide material of wall 13. For example, in a light guide 10 in which light is reflected twenty times on average by a prism light guide film about 20% of the light may be lost.
 Great care is required in handling the prism light guide film. Scratches or abrasion of the exposed soft optical surfaces of the film can greatly degrade the reflectivity of the film. For this reason, prism light guide tubes also require a protective housing to preserve optical quality over time.
 Prism light guides typically only reflect light efficiently in cases where the light is incident on the prism light guide within a fairly small range of angles. For this reason, hollow light guides made with current prism light guide films are best used with light sources that produce reasonably well collimated light (e.g. light that diverges by 25 degrees or less). Also, the reflectivity of prism light guide films as a function of angle of incidence typically drops sharply at a threshold angle.

Figure 2:
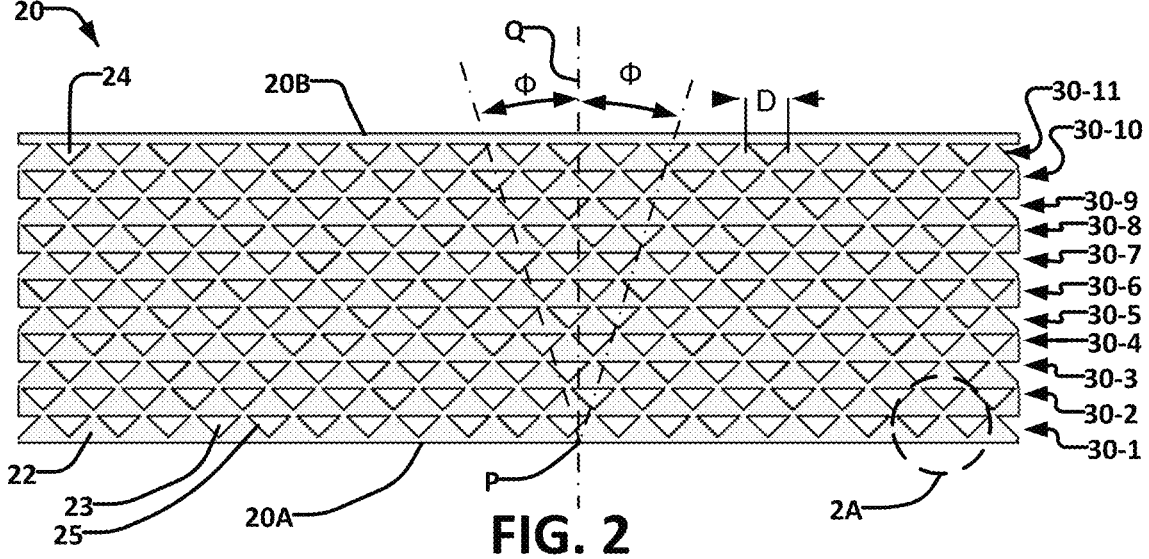
FIG. 2 is a transverse cross section of an example film according to an example embodiment of the present invention.

FIG. 2 is a schematic cross section view of a film 20 according to an example embodiment of the present invention. Film 20 has a first face 20A intended to receive incident light and a second face 20B opposed to first face 20A. For example, film 20 may be formed into a tubular structure (e.g. a structure similar to light guide 10) with face 20A facing into a bore of the tubular structure and face 20B facing radially outwardly.

Film 20 comprises an optically transparent material 22 that has a first index of refraction $n_{22}$. Inside material 22 are longitudinally extending channels 23 that have a second index of refraction $n_{24}$ where $n_{24} < n_{22}$. For example, channels 23 may be filled with a material 24 that has index of refraction $n_{24}$. As another example, channels 23 may be evacuated (e.g. channels 23 may contain a rarified gas or a vacuum). Channels 23 have cross-sectional shapes that provide reflecting interfaces 25.

Material 22 may, for example, be a polymeric material such as an optically transparent plastic, glass, or the like. Material 22 is preferably flexible. For example, material 22 may be sufficiently flexible that film 20 can be rolled into a tube having a diameter of 10 cm or less without damage to material 22.

In some embodiments a ratio of the index of refraction of material 22 to the index of refraction of material 24 is at least 1.3:1. For example material 22 may be an acrylic plastic having an index of refraction of about 1.5 while material 24 may be air and may have an index of refraction of about 1. Smaller ratios can also work. For example material 22 may be a polycarbonate material having an index of refraction of about 1.6 while material 24 is a lower index plastic, for example Teflon which has an index of refraction of about 1.4 giving a ratio of 1.6:1.4 or about 1.14:1.

Figure 2A:
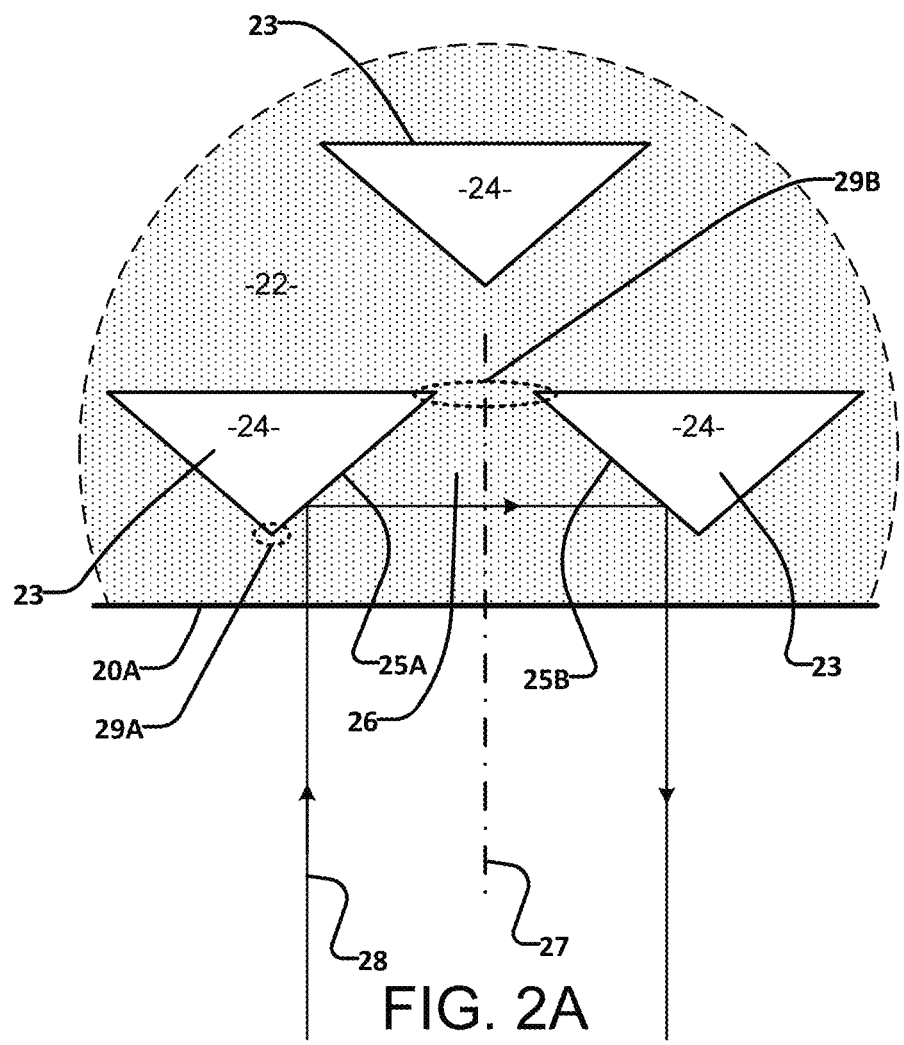
FIG. 2A is a blown up view of portion 2A of the film shown in FIG. 2.

Interfaces 25 are arranged in pairs. FIG. 2A is a blown up portion of FIG. 2 which shows that between a pair of interfaces 25 (labelled 25A and 25B in FIG. 2A) is a longitudinally extending rib 26 of material 22. Interfaces 25 are flat and are angled relative to face 20A.

Because material 22 has a greater index of refraction than material 24, light that enters film 20 through face 20A and reaches an interface 25 will be totally internally reflected as long as the light is incident on the interface 25 at an angle that exceeds the critical angle. The critical angle is given by:

$$\theta_C = \sin^{-1}\frac{n_{24}}{n_{22}}$$

In general a lower critical angle is better than a higher critical angle. However, as explained below, it is not mandatory that light primarily interacts with film 20 by total internal reflection.

A pair of interfaces 25A and 25B on opposing sides of a rib 26 are arranged at a right angle (90 degree angle) to one another. Interfaces 25A and 25B are each oriented at 45 degrees to a plane 27. In some embodiments, plane 27 is perpendicular to face 20A. As shown by light ray 28, light incident on interface 25A from a direction parallel to plane 27 will be reflected by total internal reflection through rib 26 to interface 25B where the light will be reflected back in a direction parallel to plane 27.

Interfaces 25 may be interfaces between dielectric materials and may be free of metal.

In some embodiments channels 23 comprise a plurality of flat facets and the angles between different ones of the facets are all multiples of 45 degrees. In some such embodiments each of the facets is oriented at an angle to front face 20A that is a multiple of 45 degrees.

In some embodiments, channels 23 are triangular in cross section. For example, channels 23 may have cross sections that are right angle isosceles triangles. The hypotenuse of the cross section (i.e. the faces of channels 23 that face away from face 20A of film 20) may be oriented parallel to face 20A as shown, for example, in FIG. 2A.

Dimensions of the cross sections of individual channels 23 may be small. However, channels 23 are preferably significantly larger than the wavelength of light that is to be reflected. For example, the maximum transverse dimension D of channels 23 may be at least 1 µm or at least 5 µm or at least 10 µm for reflecting visible light (light having wavelengths in the range of 380 to 700 nanometers).

Persons who are skilled in the field of optics will notice that light may leak at locations between interfaces 25. For example, light may leak into a channel 23 at an area 29A around an edge of the channel 23 which lies at a corner at the intersection of two interfaces 25 of the same channel. Such leakage may result from imperfections in the shaping of the channel 23 near the edge. For another example, light may leak through parts 29B of film 20 located between adjacent channels 23.

Despite the light leakage past individual interfaces 25 the overall reflectivity of film 20 can be very high because interfaces 25 are present at different depths from face 20A of film 20. Light that escapes past one set of interfaces 25 is likely to be reflected at another set of interfaces 25 located deeper within film 20. In summary, the number of layers of interfaces 25 provided by film 20 effectively compensates for the leakage of light past individual interfaces 25.

Channels 23 extend in a longitudinal direction along film 20. In a cross section of film 20 in a direction perpendicular to the longitudinal direction (e.g. as in FIG. 2) channels 23 may, for example be arrayed in a plurality of layers 30. Film 20 of FIG. 2 includes eleven layers 30-1 through 30-11. Other films according to the invention may have more or fewer layers of channels 23. A film 20 may have as few as two layers of channels and up to any reasonable number of layers of channels.

The material 24 filling channels 23 may be any suitable material that has an index of refraction sufficiently lower than that of material 22 to achieve a desired critical angle. In some embodiments channels 23 are hollow channels filled with air or another gas or a liquid. Channels 23 are optionally sealed. In some embodiments channels 23 are filled with a suitable plastic or polymer.

The large number of longitudinal channels 23 at different depths in film 20 can yield a high overall reflection (e.g. 99%) and a low transmission (e.g. 1%).

Figure 3:
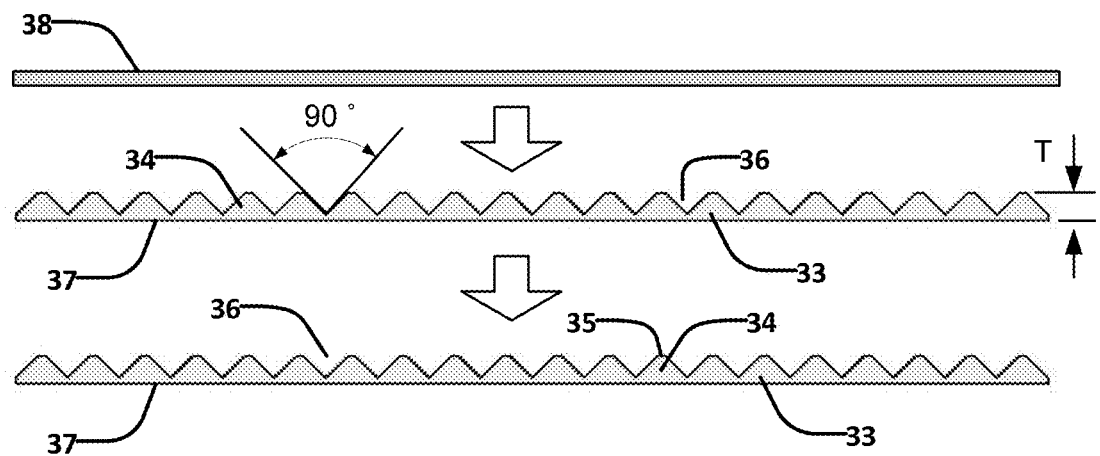
FIG. 3 is an exploded view showing assembly of a light reflective film from sheets patterned with ridges.

A film 20 as described herein may be made by a variety of manufacturing techniques. In one example method, film 20 is formed from a plurality of adhered together sheets 33. This is illustrated in FIG. 3. Sheets 33 are made of material 22 and are formed on one side with elongated ridges 34.

Figure 3A:
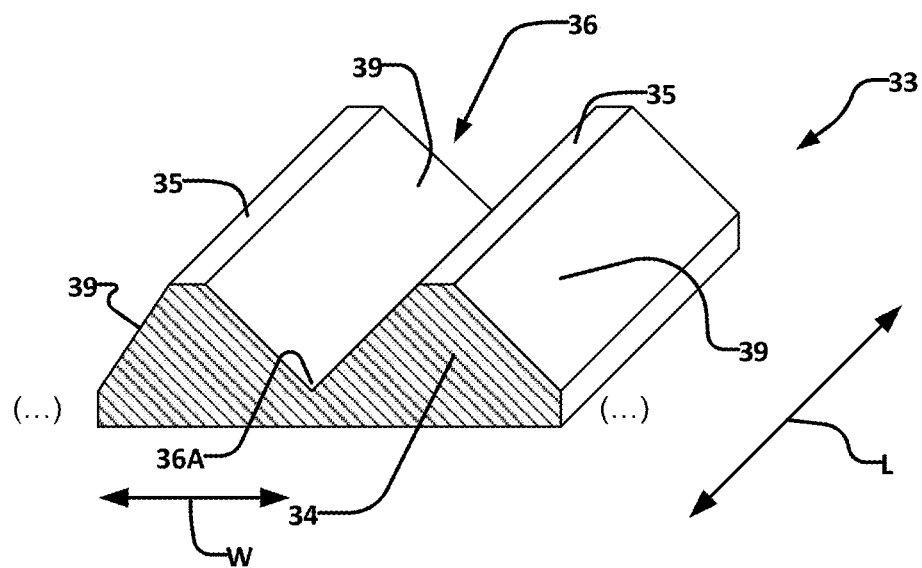
FIG. 3A is a magnified isometric view of a small section of one sheet from FIG. 3.

FIG. 3A shows a small section of a sheet 33 with ridges 34 extending along a longitudinal dimension L of sheet 33 and spaced apart across sheet 33 along a transverse or width dimension W of sheet 33. Sheet 33 may have any practical length and any practical width.

Ridges 34 optionally have flattened tops 35 so that, in cross section, ridges 34 have the form of truncated triangles. Flattened tops 35 may permit more sheets 33 to be included in a film 20 of a given thickness and/or may be used to facilitate bonding adjacent sheets 35 together.

Individual sheets 33 may, for example, have thickness T on the order of about 25 µm. In some embodiments an overall thickness of film 20 is in the range of about 0.1 mm to 1 mm.

An individual sheet 33 may provide relatively poor performance as a prism light guide because significant amounts of light would leak through flattened tops 35 as well as at any imperfections in the bottoms 36A of V-shaped grooves 36 that are defined between ridges 34. In some embodiments, individual sheets 33 pass 5% or more of the light incident on them from their faces opposite to grooves 36. For the sheets 33 illustrated in FIG. 3 about 10% of light might be lost (by passing through the sheet 33) per reflection.

Two sheets 33 may be stacked together to form one row of channels 23. Channels 23 are formed by V-shaped grooves 36 that are closed by the front face 37 of an adjacent sheet 33. Grooves 36 preferably have a dihedral angle of 90 degrees. Rear face 20B of the resulting film may optionally be closed by a smooth layer 38.

Flattened tops 35 may be used to join to adjacent sheets 33 so that internal longitudinal channels 23 are formed between sheets 33. The resulting structure may provide a continuous polymer matrix. Longitudinally extending channels 23 are defined inside this matrix. Channels 23 may be filled with air. Flanks 39 of ridges 34 provide interfaces at which light incident from inside ridges 34 can be totally internally reflected.

For example, sheets 33 may be joined by adhesive bonding or welding or heat bonding or the like at flattened tops 35. In some embodiments spots of adhesive or spot welds are spaced apart along flattened tops 35. In some embodiments only a small proportion (e.g. about 3% or less or about 1% or less) of the total area of flattened tops 35 is covered by adhesive or welds.

Any suitable number of sheets 33 may be stacked to form a film 20. For example, in some embodiments a film 20 is made up of 4 to 10 sheets 33. In some embodiments a film 20 is made up of at least 2 sheets 33. In some embodiments a film 20 is made up of 2 to 15 sheets 33.

Ridges 34 on one layer 30 may be shifted relative to ridges 34 of other layers. It is not mandatory that each sheet 33 in a film 20 be the same as other sheets 33 in film 20. For example, in different sheets 33 ridges 34 may be spaced apart by the same or different pitches and/or different sheets 33 may have the same or different thicknesses. In different layers ridges 34 are parallel or nearly so.

Layers 33 may, for example be made of a precursor film manufactured in a commercial roll to roll process. The precursor film may, for example have a thickness of about 10% of that of current prism light guide films. In some embodiments layers 33 each have a thickness of about 3 μm or more. For example, sheets 33 may have thicknesses in the range of 3 μm to 50 μm. It is not necessary but is convenient for sheets 33 to have the same thickness.

The precursor film may be made to tolerances that are looser than are required for current prism light guide films (e.g. it is not necessary that the shapes of individual channels 23 be precisely maintained since light that leaks past any particular channel 23 as a result of a defect in the form of the channel has a high likelihood of being reflected by other channels 23 provided in one or more subsequent layers 30; also the design of individual layers 30 does not require adjacent prisms that abut one another or any precisely maintained geometry of individual channels 23).

Other example ways for making a film 20 include extrusion and forming material 22 around an array of rods or fibers of material 24. For example, in an example embodiment a film 20 comprising channels 23 is extruded using a suitable die. In another example embodiment a film 20 is prepared by aligning rods or fibers of material 24 and forming a layer of material 22 around the rods or fibers (e.g. by casting the rods or fibers of material 24 into a layer of material 22). In some embodiments the channels are provided by hollow aligned fibers of material 24.

By providing a large number of channels 23 at different depths in film 20 that each act to redirect light rays as described herein one can create a situation where substantially all or nearly all of the light that hits face 20A of film 20 within a range of angles is reflected by film 20. In films like those shown in FIG. 2 light is reflected at pairs of interfaces 25. If the light leaks past one set of interfaces 25 the light is highly likely to encounter and be reflected by other interfaces 25 that are deeper within film 20.

Figure 2B:
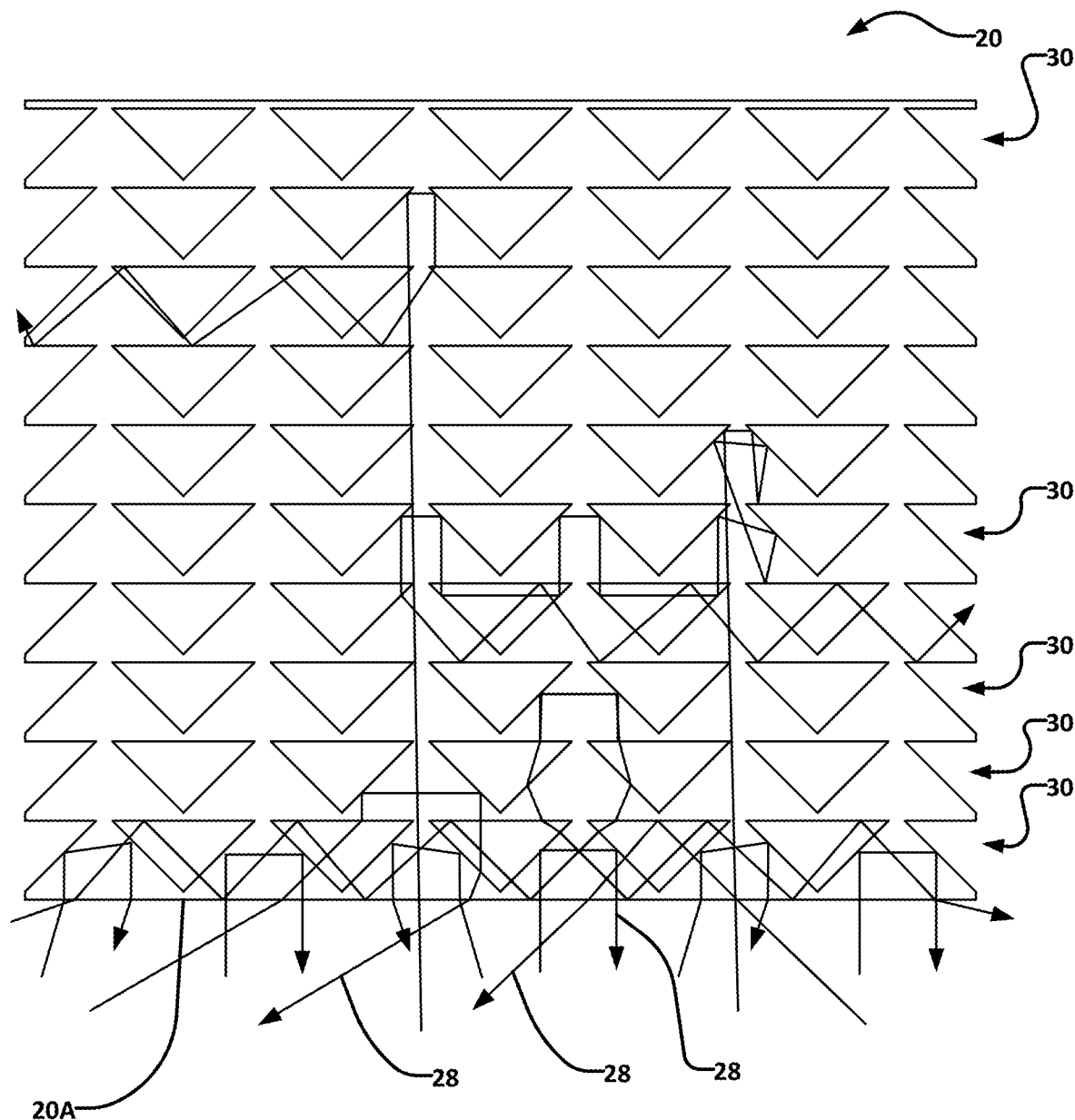
FIG. 2B is a transverse cross section of a film similar to the film of FIG. 2 illustrating paths taken by various light rays incident on the front face of the film.

FIG. 2B shows an example film 20 that is similar to film 20 of FIG. 2. Paths 28 taken by a number of example light rays incident on front face 20A are shown. FIG. 2B illustrates how if channels 23 in each layer 30 reflect a sufficient proportion of the incident light then the number of light rays that penetrate to a given distance into film 20 drops off very significantly as the distance increases. Very little light may penetrate deeper into film 20 than 3 to 5 layers 30. Where layers 30 have the same construction most of the light may be reflected by the layer 30 closest to front face 20A. Most of the remaining light may be reflected by the next layer 30 and so on.

Some embodiments take advantage of the fact that most light is reflected in the first few layers 30 by making one or more layers 30 closest to front face 20A of a material that absorbs very little light and/or a material that allows well defined closely spaced channels 23 to be formed. Other parts of film 20 may be made of materials that may be less expensive but may absorb light more strongly and/or may define channels 23 with imperfections that can allow more light to travel deeper into film 20.

In general it is desirable that channels 23 are sufficiently large, sufficiently numerous and distributed such that fewer than a selected percentage of a population of light rays incident on face 20A of film 20 pass directly through film 20 from front face 20A to rear face 20B without striking and being reflected by at least one interface 25. The selected percentage may, for example, be 6% or 5% or 3% or 1.5% or 1%. For some applications it is beneficial that less than 1% of light incident on face 20A can pass directly through film 20.

As illustrated in FIG. 2, in some embodiments, channels 23 are distributed in film 20 such that from any point P along a cross section of film 20 substantially all lines that enter film 20 at front face 20A with an angle within ±φ of a plane Q that is parallel to channels 23 and is perpendicular to front face 20A crosses at least one interface 25 before reaching rear face 20B of film 20. For example, φ may be in the range of 10 degrees to 60 degrees (e.g. 10 degrees or 15 degrees or 20 degrees or 30 degrees etc.).

The proportion of the lines that enter film 20 at point P with angles in the range of ±φ of plane Q that do cross interfaces 25 may be determined as the ratio of the aggregate of all angular ranges within the range of ±φ for which the lines originating at point P do cross at least one interface 25 to the total angle between ±φ which is 2φ.

In some embodiments the ratio, expressed as a percentage is in excess of 90% or 95% or 98% or 99% or 99.9%. For example, in some embodiments the ratio of the aggregate of all angular ranges within the range of ±φ for which the lines originating at a point P on film 20 do cross at least one interface 25 to the total angle between ±φ is at least 98:100 for all φ in the range of 30 degrees to 70 degrees.

A film could optionally be made to have a structure as described herein only in certain parts of the film. For example strips along lateral edges of the film might not include channels 23. These strips might, for example, be used for handling the film and might be trimmed off before using the film. An "active area" of the film may be defined as an area of the film within which the film reflects at least 90% of light that is incident on a front face of the film at an angle of 45 degrees or more to a direction normal to the film.

In some embodiments, the channels are arranged at a plurality of different depths relative to the front face of the film and distributed in the film such that at least within an active area of the film substantially all straight lines in a transverse cross section plane of the film that originate from any point P on the front face of the film and enter the film with an angle in the range of ±φ of a plane that is parallel to the channels and is perpendicular to the front face of the film cross at least one of the channels before reaching a rear face of the film where φ is 60 degrees. In some embodiments substantially all of such lines cross at least two or at least three of the channels before reaching the rear face of the film. In some embodiments, wherein within the active area the film reflects at least 90% of:

light having a wavelength in the range of 500 nm to 700 nm that is incident on the front face of the film at an angle of 45 degrees or more to a direction normal to the film; and/or light having a wavelength of 600 nm that is incident on the front face of the film at an angle of 45 degrees or more to a direction normal to the film; and/or light having any of two or more of or three or more of the following wavelengths: 500 nm, 550 nm, 600 nm, 650 nm, 700 nm and 750 nm that is incident on the front face of the film at an angle of 45 degrees or more to a direction normal to the film.

Figure 4:
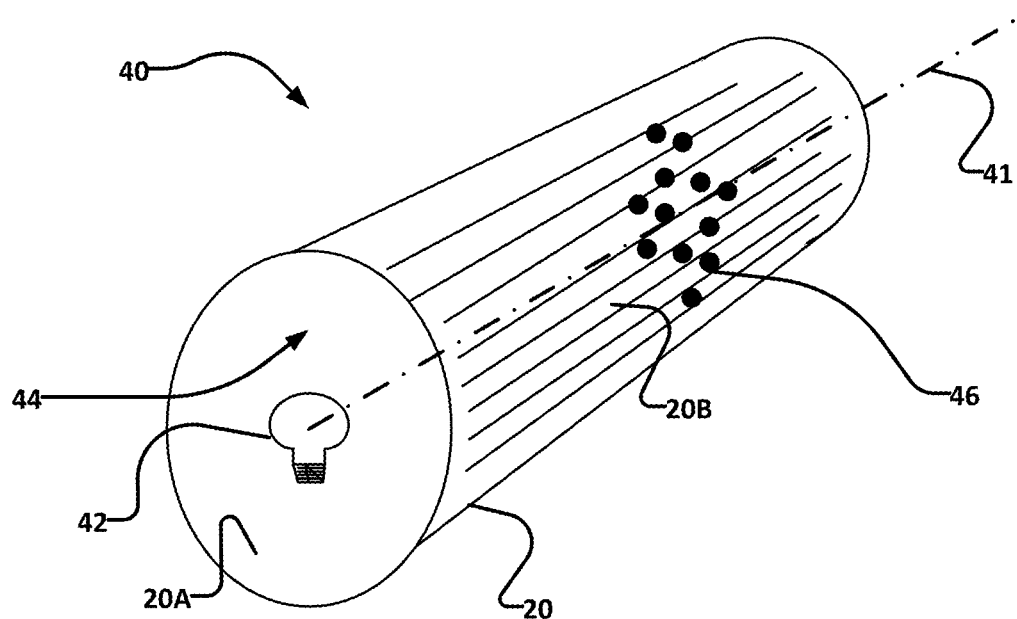
FIG. 4 is a schematic perspective view of a light guide incorporating a film as described herein.

FIG. 4 schematically shows an example light guide 40 that comprises a tube of a film 20 as described herein. Face 20A makes up an inside wall of light guide 40 that defines a passage 44. Light guide 40 carries light from a light source 42. Channels 23 (not shown in FIG. 4) are arranged parallel to an axis 41 of light guide 40.

Light source 42 may comprise any suitable light source (e.g. the sun, a sunlight collector, a light emitting diode (LED) or group of LEDs or other solid state light emitters or a light bulb).

Each ray of light that passes through passage 44 travels in a direction that has an axial component parallel to axis 41 and a radial component that is radial relative to axis 41. In film 20 the axial component of light rays in passage 44 is parallel to channels 23. Due to the symmetry of channels 23 which are at least substantially parallel to the axial components of the light rays, the interaction of light rays in passage 44 with film 20 substantially preserves the axial components of the light rays. Reflections of light rays by film 20 change the directions of the radial components of light rays, thereby steering light rays that hit film 20 back into passage 44.

Figure 4A:
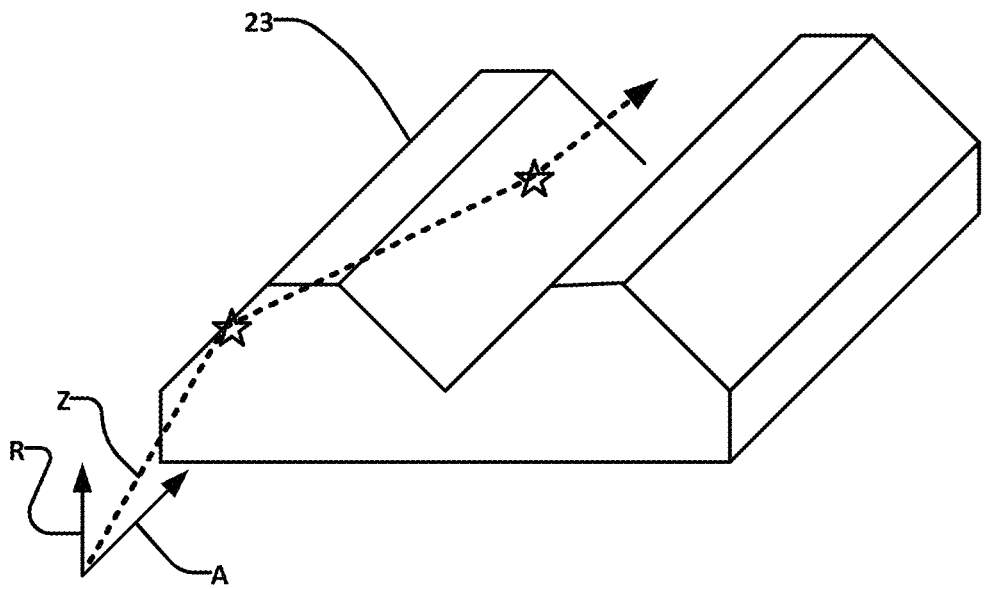
FIG. 4A is a schematic drawing illustrating the interaction of a light ray with a portion of a film 20 which preserves an axial component of the direction of a light ray.

This is illustrated in FIG. 4A which schematically shows interaction of a light ray Z having axial component A and radial component R with one channel 23 in a film 20.

Figure 4B:
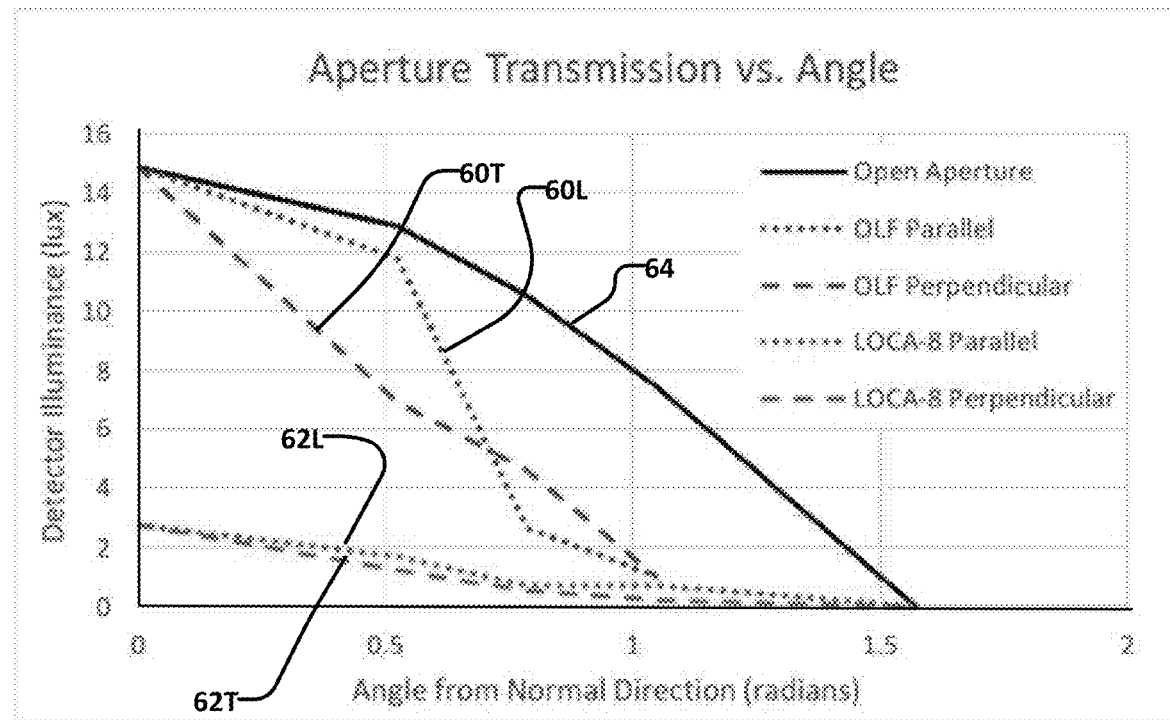
FIG. 4B is a graph showing reflectance as a function of angle of incidence for different films.

The angular dependence of reflectivity of a film 20 as described herein can advantageously be much lower than that of conventional prismatic films. FIG. 4B is a graph which shows transmission of light through different films as a function of angle relative to a direction normal to the film. Curve 60T is for a conventional commercial prism light guide film (optical lighting film or "OLF") where the light is incident in a plane transverse to the OLF (across the prisms). Curve 60L is for the same OLF of curve 60T except that the light is incident in a plane longitudinal to the OLF (parallel to the prisms). Curve 62T is for a film 20 of the type shown in FIG. 2 having 8 layers of channels 23 where the light is incident in a plane transverse to the film 20 (across channels 23). Curve 62L is for the same film 20 of curve 62T except that the light is incident in a plane longitudinal to the film 20 (parallel to channels 23). Curve 64 shows transmission of light through an open aperture (no film).

It can be seen from FIG. 4B that film 20 is much more reflective than the commercial OLF (lower transmission) at all angles lower than 1 radian. It can also be seen that at normal incidence (0 radians) the commercial OLF reflects almost no light (the light transmission values of curves 60T and 60L essentially coincide with an open aperture at zero radians). The improved reflectivity of film 20 at lower angles facilitates directing light that has greater divergence (is less collimated) along a hollow light guide made of film 20.

It may be desirable for the light from light guide 40 to illuminate areas that light guide 40 passes through. Light can be made to selectively escape from a light guide 40 made with a film 20 as described herein by providing light transmitting features which are areas in which film 20 is more transparent to light incident from front face 20A. Light transmitting features may be distributed all over a film 20 or in selected portions of a film 20.

The light transmitting features may, for example comprise one or more of: apertures in film 20 and/or light transmitting areas in film 20 in which channels 23 are filled with a material that has the same or nearly the same index of refraction as material 22 and/or areas in film 20 in which V-grooves 36 are flattened so that their bottom surfaces are parallel or nearly parallel to front face 20A. In some embodiments a film 20 as described herein has light transmitting features of two or more different types.

In some embodiments individual ones of the light transmitting features are spots small enough to fit within a circle of diameter 2 mm or 1 mm or 0.5 mm or 0.1 mm. In some embodiments individual ones of the light transmitting features have areas in the plane of film 20 that do not exceed 2 mm$^2$ or 1 mm$^2$ or 0.5 mm$^2$ or 0.25 mm$^2$ or 0.1 mm$^2$ or 0.05 mm$^2$ or 0.01 mm$^2$.

The light transmitting features may be arranged in small spaced apart areas (which may for example comprise small shapes such as circles, ellipses, rectangles etc. scattered over sheets 33 and/or or stripes extending across sheets 33.

FIG. 4 schematically illustrates light transmitting features 46. Some light may exit passage 44 through features 46. Other light may exit passage 44 at the far end of passage 44. In some embodiments a light reflector (e.g. a mirror) is provided at one or both ends of passage 44.

The presence and/or density and/or size(s) of light transmitting features in film 20 may be varied with distance along a light guide 40 and/or with angle around the light guide 40 to cause light to be emitted where it is needed or wanted. A density distribution of the light transmitting features along the light guide may be non-uniform. The density distribution may be selected by modelling or experiment to yield uniform emission of light through the wall of the light guide 40 (or another desired intensity distribution for the emitted light).

Light transmitting features may be provided in a film 20 that reflects a large proportion of the light that is incident on it in various ways including:
  forming small apertures in the film 20 (e.g. by punching, laser cutting, waterjet cutting or other suitable process);
  filling small areas of channels 23 with a material that has an index of refraction close to that of material 22. The filling material may comprise an adhesive. Spots or small stripes of such filling material may, for example be applied to sheets 33 before sheets 33 are joined to form a film 20 as described above. The filling material may, for example, be deposited by spraying, using ink-jet printing techniques, dropping thin strands of material across a sheet 33 etc.;
  flattening all or portions of grooves 36 in small areas of sheets 33 by pressing or the like before attaching sheets 33 to form a film 20; and/or
  heat pressing small areas of film 20 to flatten or eliminate channels 23 in the small areas.

The film 20 illustrated in FIG. 2 is just one example of a film 20 according to the invention. For example, a film 20 may be varied from the film 20 shown in FIG. 2 by one or more of:
  altering the distribution of channels 23 within the cross section of a film 20;
  altering cross sectional shapes of channels 23;
  altering the sizes of channels 23; and/or
  altering a number of layers of channels 23 in a film 20 (in cases where channels 23 are arranged in countable layers); and/or making channels 23 heterogeneous (e.g. by providing a film 20 in which different channels 23 have different cross sectional areas and/or different cross sectional shapes).

There are many ways in which channels 23 may be distributed through film 20. For example, channels 23 may be arranged:
  in plural parallel layers 30 as shown, for example in FIG. 2;
  in a more random distribution as shown, for example, in FIG. 5.

Figure 5:
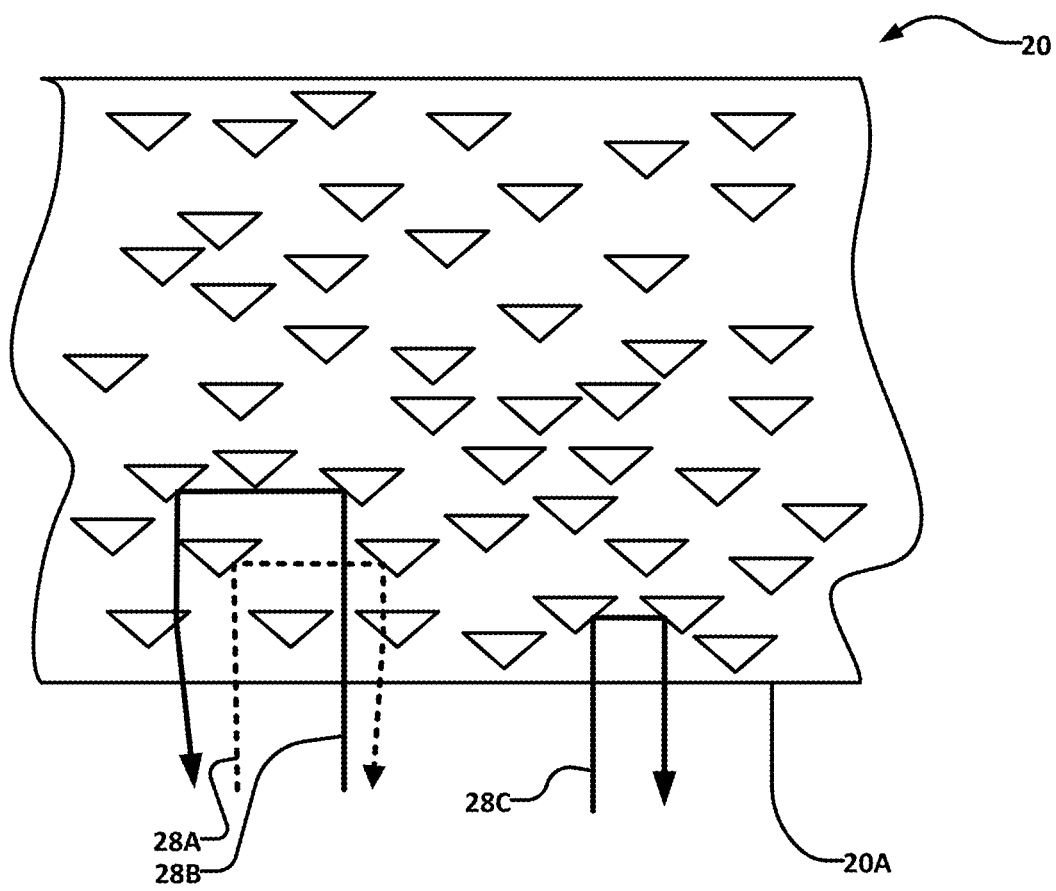
FIG. 5 is a transverse cross section of another example film according to an example embodiment of the present invention.
Figure 5A:
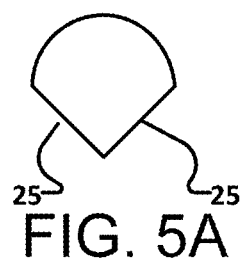
FIG. 5A to 5H illustrate various example cross-sectional shapes of channels that may be provided in films as described herein.
Figure 5C:
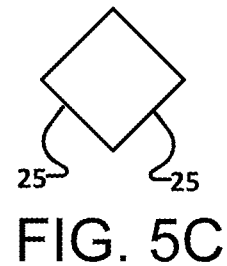
Figure 5B:
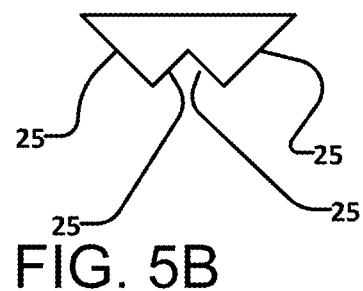
Figure 5D:
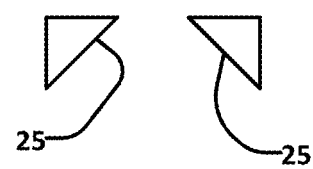
Figure 5E:
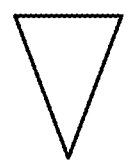
Figure 5F:
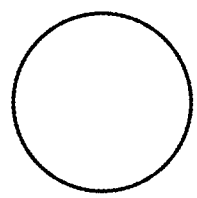
Figure 5G:
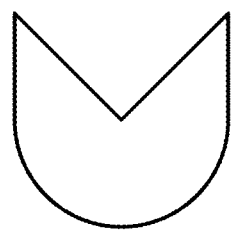
Figure 5H:
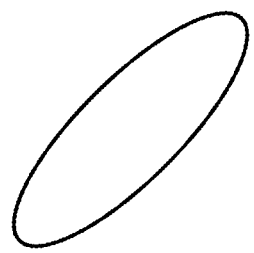

FIG. 5 shows example light rays 28A, 28B and 28C being reflected at interfaces 25 that are at different depths in film 20 from front face 20A.

Channels 23 may have shapes other than those described above. FIGS. 5A to 5H illustrate alternative possible cross-sectional shapes for channels 23. Ideally channels 23 have cross sectional shapes such that the direction of propagation of light rays that encounter channels 23 are significantly altered, for example, by reflection (which could be but is not necessarily total internal reflection at an interface between channel 23 and the surrounding material 22) and/or refraction as a light ray passes into and out of the channel 23 and/or scattering e.g. at an interface between channel 23 and the surrounding material.

Figure 6:
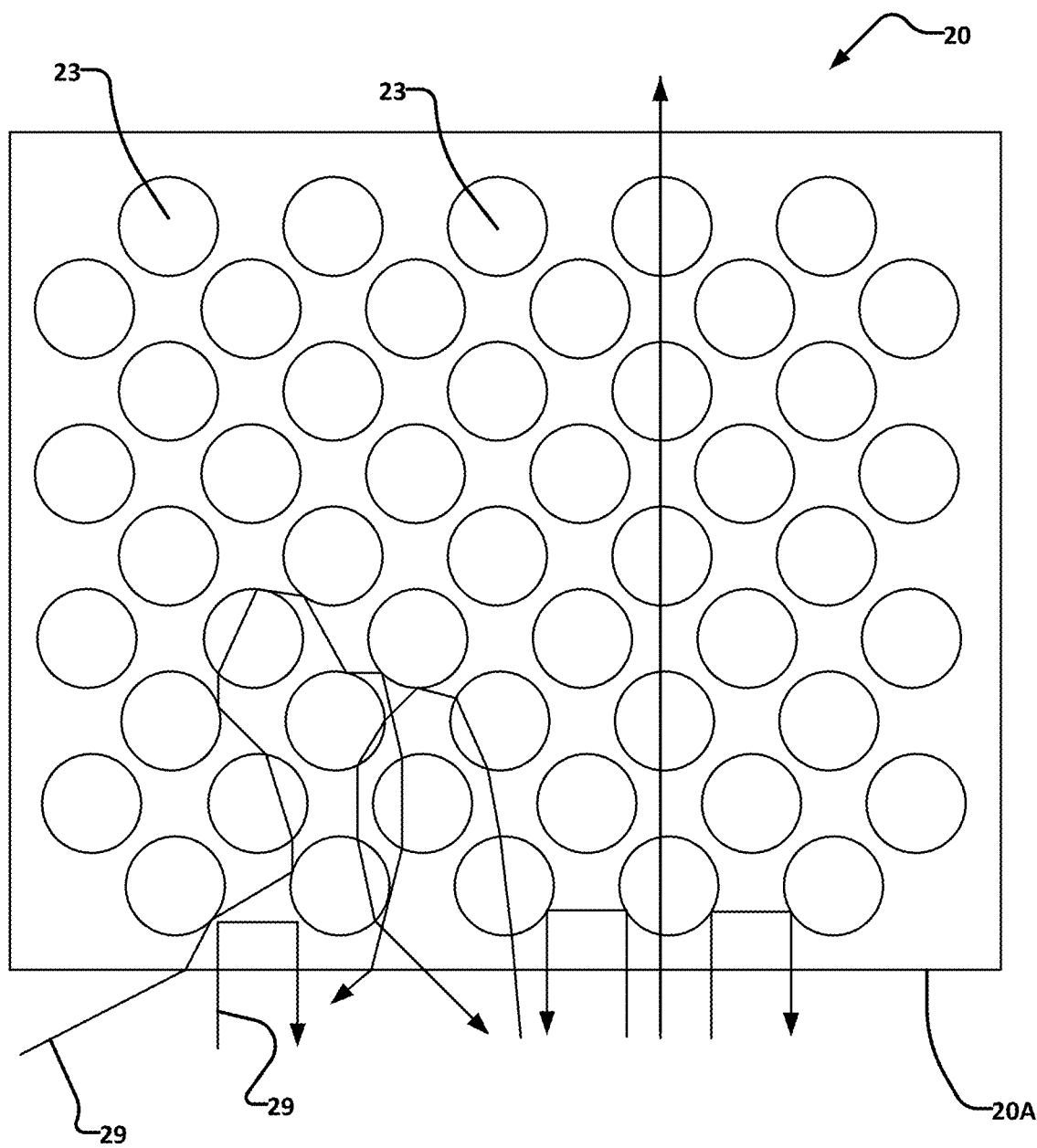
FIG. 6 illustrates an example film having channels with circular cross sections.

FIG. 6 illustrates an example film 20 in which channels 23 are circular. FIG. 6 shows paths taken by example light rays 29 in film 20. Even if circular channels 23 are less efficient at reflecting light incident on front face 20A than the right angle triangular channels of FIG. 2, a film having the construction shown in FIG. 6 can be made as reflective as needed by including more layers of channels 23.

In some embodiments, major portions of surfaces of channels 23 that face front face 20A are at a significant angle to the plane of front face 20A. In some embodiments the significant angle is in the range of 45±ψ degrees where ψ is less than 30 degrees or less than 17 degrees.

In some embodiments faces of channels 23 that face toward front face 20A possess octature with front face 20A. In some embodiments all faces of channels 23 possess octature with front face 20A. "Octature" is a property of a relationship between a prismatic element (e.g. an elongated element that has flat faces) and a planar surface. The element and surface possess the property of octature when an angle between a vector normal to any selected surface of the element and the planar surface is an integer multiple of 45° to within ±2%. For example a channel 23 and front face of a film 20 can possess octature when the channel 23 is polygonal in cross section and has flat facets and an angle between a vector normal to any selected one of the facets and the front face of the film 20 is an integer multiple of 45° to within ±2%. In some embodiments channels 23 and front face 20A of film 20 possess octature, In some embodiments, cross sections of channels 20 are polygons. The polygons are optionally regular polygons.

The technology described above may be incorporated into a range of products including:
light reflecting films 20 as described herein (such films may be provided in different thicknesses with different levels of reflectivity—for example the different films may be made up of different numbers of attached together sheets 23).
light guides and assemblies that include light guides.
luminaires.
light fixtures (e.g. light fixtures that include films as described herein arranged to reduce light loss and/or to achieve a desired distribution of output light (uniform or otherwise).
illumination systems for commercial uses (e.g. warehouses, factories, greenhouses, commercial spaces etc.) and residential uses.
solar lighting systems.
etc.

Those of skill in the art will appreciate that films as described herein may possess advantages in comparison to prior art prism light guide films (e.g. as shown in FIG. 1). For example, such films may possess one or more of the following advantages:
Interfaces 25 may be entirely contained within an interior volume of film 20 and are therefore protected from degradation (e.g. as a result of handling, dust, exposure to water, environmental factors, etc.). Since the active optical elements (interfaces 25) are all internal, no special handling is required in use, and in many cases no protective cover is needed to maintain high optical quality of film 20.
A film 20 may provide the same reflectivity as a prior prism light guide even if it is made to a lower level of precision. Even if individual channels 23 have corners that are not perfectly formed and/or individual channels 23 do not abut adjacent channels 23 a film 20 may still provide reflectivity that is as high or higher than a prior prism light guide film as a result of the use of an array of channels 23 at different depths within film 20. The number of layers of channels 23 in the film 20 can effectively compensate for increased light leakage past or through individual channels 23.
This relaxation of tolerances can facilitate making films 20 with practical, relatively low cost techniques such as molding and/or roll to roll processes. This relaxation of tolerances can facilitate making films 20 without additives or materials that are sometimes used to facilitate high precision forming of prism light guide films but may absorb light. Material 22 of films 20 may be a highly transparent polymer in which absorption of light is negligible.
The geometry of the film described herein may maintain a high reflectivity (e.g. at least 98% or at least 99%) over a wider range of angles than most prism light guides.
A film 20 that includes a large number of channels 23 may have lower weight and/or use less material than a conventional prism light guide that offers similar performance. This enables commensurately reduced material cost.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. an adhesive, light source, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that some embodiments combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A light reflecting film comprising:
   a thin layer of a first material having a thickness and a first index of refraction wherein formed within the layer are channels extending parallel to one another in a longitudinal direction, the channels comprising a second material having a second index of refraction less than the first index of refraction,
   the channels arranged at a plurality of different depths relative to a front face of the light reflecting film,
   the channels having a cross sectional shape that provides interfaces at which light incident from the front face of the light reflecting film is refracted or reflected.

2. The light reflecting film according to claim 1 wherein the channels have dimensions parallel to a thickness dimension of the light reflecting film that are less than ½ of the thickness of the light reflecting film.

3. The light reflecting film according to claim 1 wherein the interfaces include first and second interfaces of each of the channels.

4. The light reflecting film according to claim 3 wherein at least one of: the first and second interfaces are each oriented at an angle of 45 degrees to the front face; and the first and second interfaces are oriented at a right angle to one another.

5. The light reflecting film according to claim 1 wherein, the cross sectional shape of the channels is an isosceles triangle.

6. The light reflecting film according to claim 5 wherein a hypotenuse of the isosceles triangle is parallel to the front face of the light reflecting film.

7. The light reflecting film according to claim 1 wherein in a cross section of the light reflecting film the channels are arranged in a regular array comprising a plurality of layers of channels.

8. The light reflecting film according to claim 7 wherein in each of the layers the channels are spaced apart from one another.

9. The light reflecting film according to claim 7 wherein the channels of at least one of the layers are staggered relative to the channels of at least one other one of the layers.

10. The light reflecting film according to claim 7 wherein the channels in different ones of the layers have different cross sectional areas.

11. The light reflecting film according to claim 7 wherein the channels in different ones of the layers have different cross sectional shapes.

12. The light reflecting film according to claim 7 comprising a plurality of stacked together sheets, each of the plurality of sheets having a first face carrying longitudinal parallel grooves that is against a second face of an adjacent one of the plurality of sheets wherein the channels are defined between the grooves and the second face of the adjacent one of the sheets.

13. The light reflecting film according to claim 1 wherein the light reflecting film comprises a plurality of affixed together sheets and at least one face of at least some of the sheets is patterned with a row of longitudinally extending spaced apart ridges separated by grooves, wherein the channels are defined between the grooves of one of the sheets and a face of an adjacent one of the sheets.

14. The light reflecting film according to claim 1 wherein the channels are filled with a gas.

15. The light reflecting film according to claim 1 wherein the material of the channels is a polymer.

16. The light reflecting film according to claim 1 comprising light transmitting features distributed over at least a portion of the light reflecting film.

17. A hollow light guide comprising a film according to claim 1 formed into a tube wherein the front face of the film faces an interior of the tube.

18. A luminaire comprising a hollow light guide according to claim 17, the luminaire comprising a light source at one end of the hollow light guide and a light source or a reflector at a second end of the hollow light guide.

19. A light reflecting film comprising:
   a layer of a first material having a thickness and a first index of refraction; wherein formed within the layer are channels extending parallel to one another in a longitudinal direction, the channels comprising a second material having a second index of refraction less than the first index of refraction, the light reflecting film having an active area within which the film reflects at least 90% of light that is incident on a front face of the light reflecting film at an angle of 45 degrees or more to a direction normal to the light reflecting film; and the channels are arranged at a plurality of different depths relative to the front face of the light reflecting film and distributed in the light reflecting film such that at least within the active area substantially all straight lines in a transverse cross section plane of the light reflecting film that originate from any point P on the front face of the light reflecting film and enter the light reflecting film with an angle in the range of $\pm\Phi$ of a plane that is parallel to the channels and is perpendicular to the front face of the light reflecting film cross at least one of the channels before reaching a rear face of the light reflecting film where $\Phi$ is 60 degrees.

20. A method for making a light reflective film, the method comprising:

assembling a stack of light transmissive sheets, wherein a plurality of the light transmissive sheets have a first face patterned with spaced apart parallel grooves and the light transmissive sheets are oriented so that the grooves in different ones of the light transmissive sheets are parallel; and affixing the plurality of light transmissive sheets together to define a plurality of channels, each channel defined between one of the grooves and a second face of an adjacent one of the plurality of light transmissive sheets the channels arranged at a plurality of different depths relative to a front face of the light reflecting film, the channels having a cross sectional shape that provides interfaces at which light incident from the front face of the light reflecting film is refracted or reflected.

* * * * *